US010564468B2

(12) United States Patent
Sugihara et al.

(10) Patent No.: US 10,564,468 B2
(45) Date of Patent: Feb. 18, 2020

(54) LIQUID CRYSTAL DISPLAY DEVICE

(71) Applicant: SHARP KABUSHIKI KAISHA, Sakai, Osaka (JP)

(72) Inventors: Yasuhiko Sugihara, Sakai (JP); Saori Kurogane, Sakai (JP); Takeyuki Ashida, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/773,332

(22) PCT Filed: Oct. 31, 2016

(86) PCT No.: PCT/JP2016/082196
§ 371 (c)(1),
(2) Date: May 3, 2018

(87) PCT Pub. No.: WO2017/077963
PCT Pub. Date: May 11, 2017

(65) Prior Publication Data
US 2018/0321552 A1 Nov. 8, 2018

(30) Foreign Application Priority Data
Nov. 5, 2015 (JP) ................................ 2015-217528

(51) Int. Cl.
*G02F 1/1335* (2006.01)
*G02B 5/30* (2006.01)
*F21V 8/00* (2006.01)

(52) U.S. Cl.
CPC ......... *G02F 1/133528* (2013.01); *G02B 5/30* (2013.01); *G02B 5/3033* (2013.01); *G02B 6/0056* (2013.01)

(58) Field of Classification Search
CPC ................................ G02B 6/0056; G02B 5/30
See application file for complete search history.

(56) References Cited

U.S. PATENT DOCUMENTS

2016/0216542 A1* 7/2016 Yoshida ............ G02F 1/133528
2018/0120488 A1* 5/2018 Takada ................. G02B 5/3025

FOREIGN PATENT DOCUMENTS

JP 2007-187781 7/2007

* cited by examiner

*Primary Examiner* — Michael H Caley
*Assistant Examiner* — Mariam Qureshi
(74) *Attorney, Agent, or Firm* — ScienBiziP, P.C.

(57) ABSTRACT

The liquid crystal display device includes: a first differently shaped polarizing plate provided with a first hole; a liquid crystal display panel; and a second differently shaped polarizing plate provided with a second hole, wherein, when directions parallel to machine directions of the first and second differently shaped polarizing plates are defined as first and second directions, a first length of the first differently shaped polarizing plate in the second direction is shorter than a second length of the second differently shaped polarizing plate in the first direction, and a first radius of curvature of the first hole at a tangent point between a straight line extending in the second direction and the perimeter of the first hole is smaller than a second radius of curvature of the second hole at a tangent point between a straight line extending in the first direction and the perimeter of the second hole.

8 Claims, 7 Drawing Sheets

Fig. 2
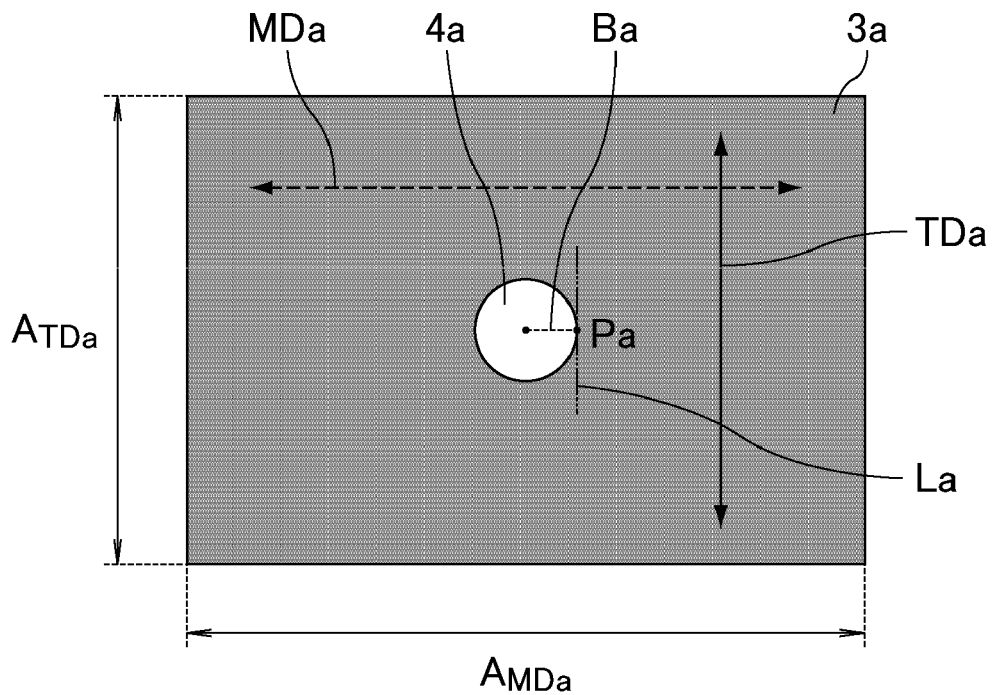
(a)
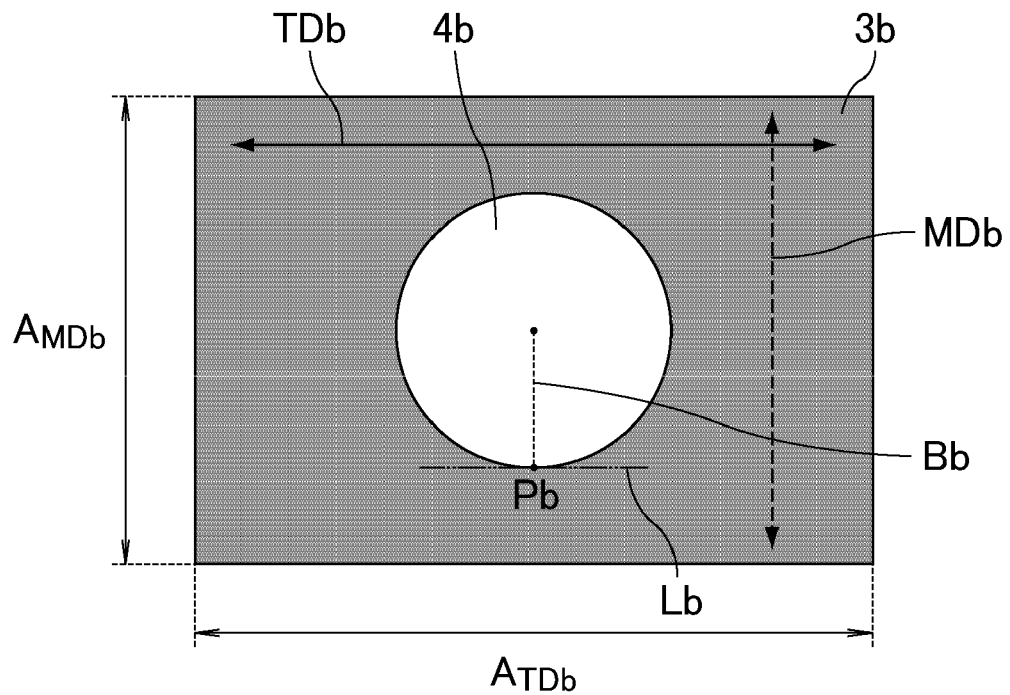
(b)

Fig. 3
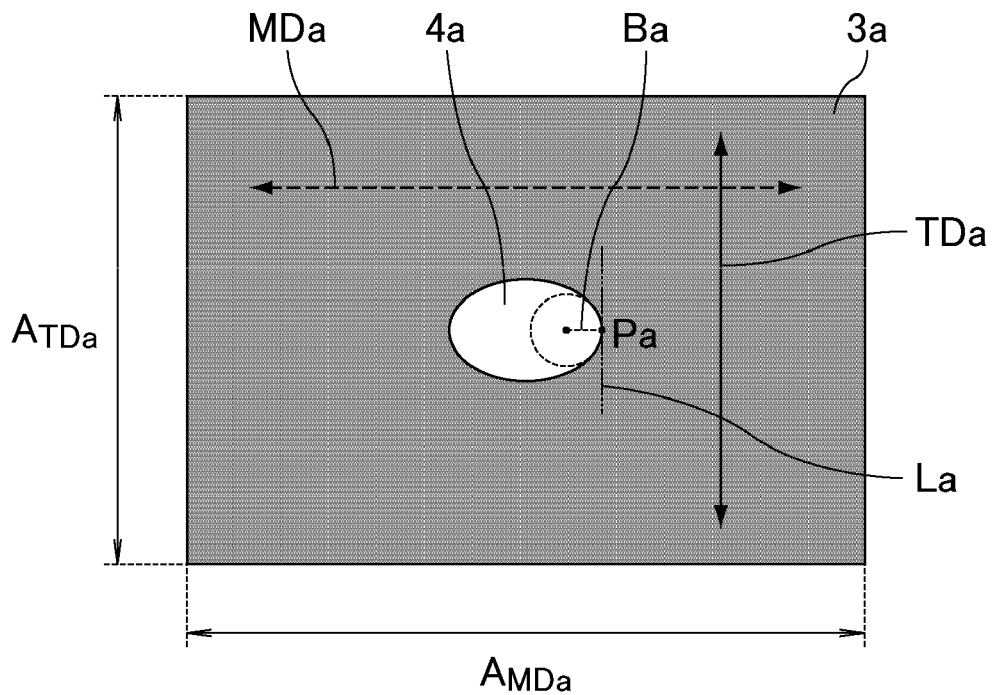
(a)
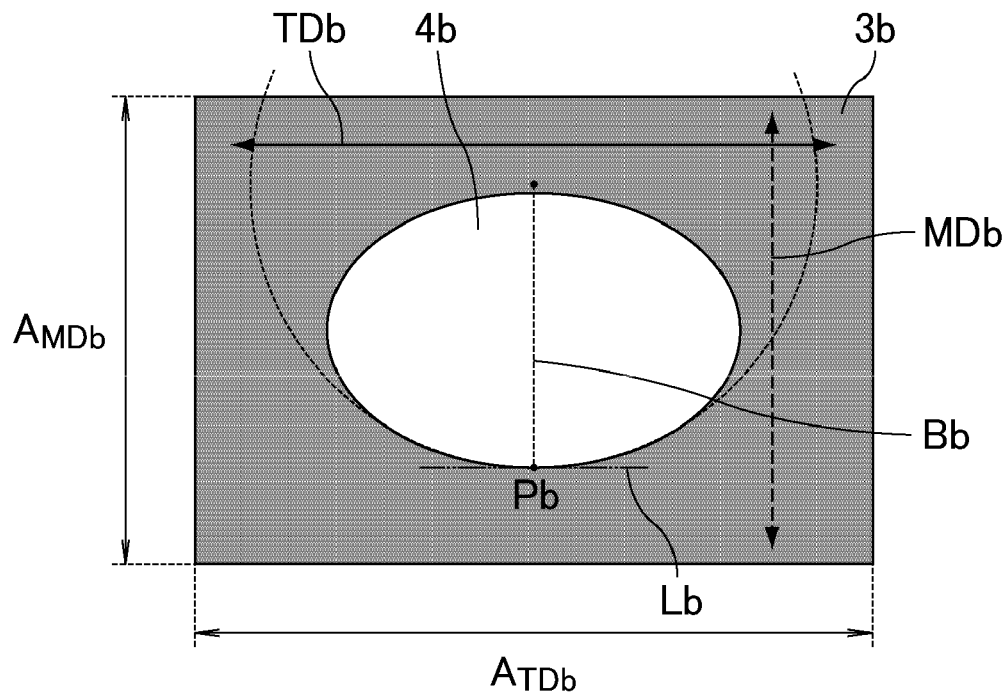
(b)

Fig. 4
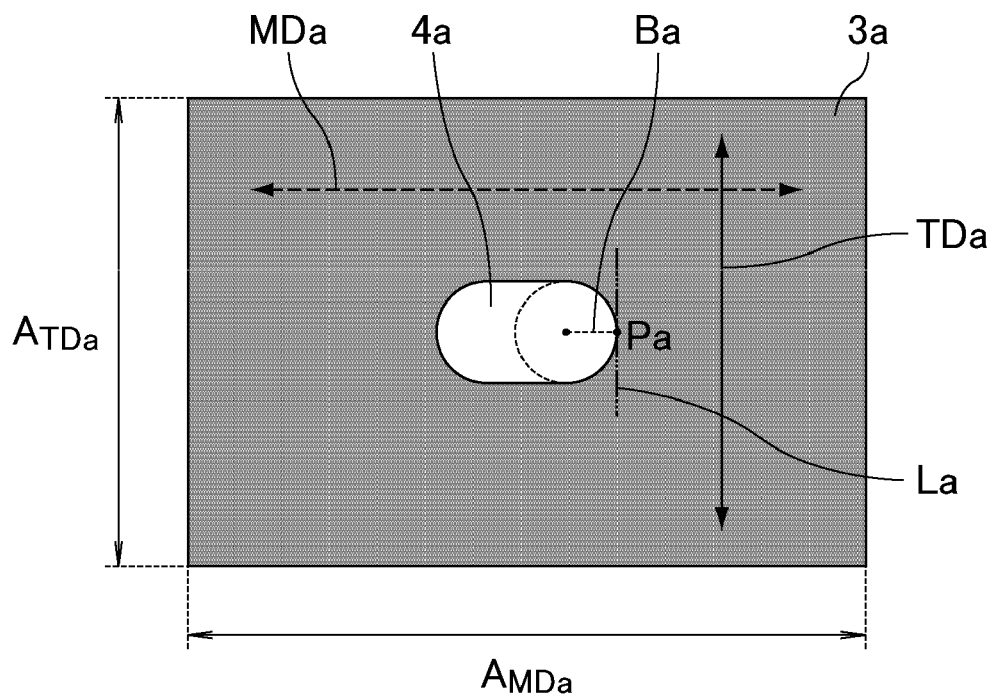
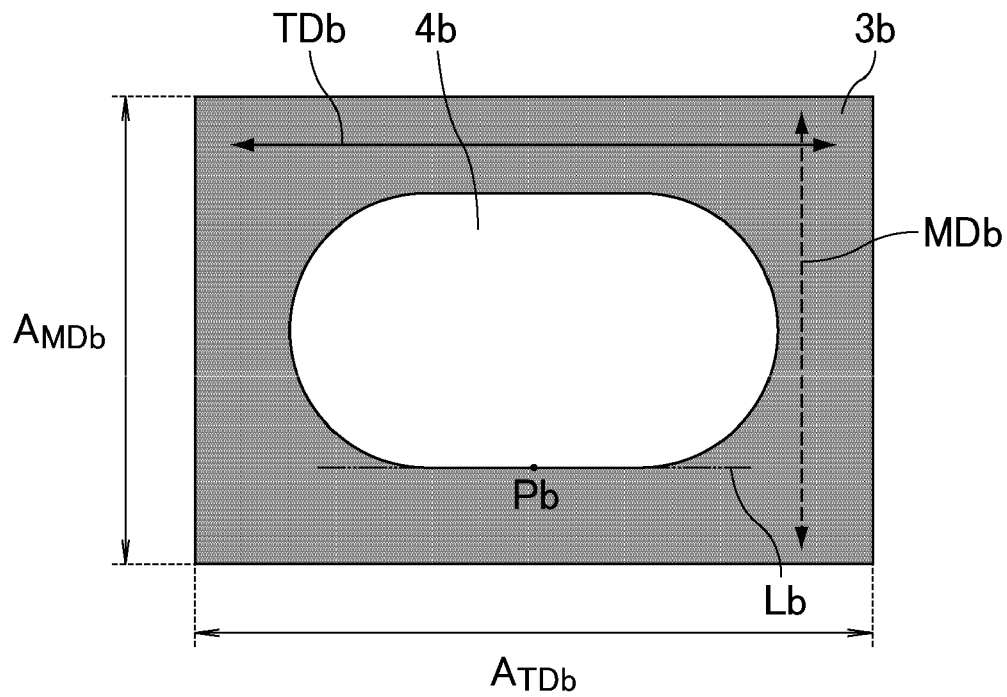

Fig. 5
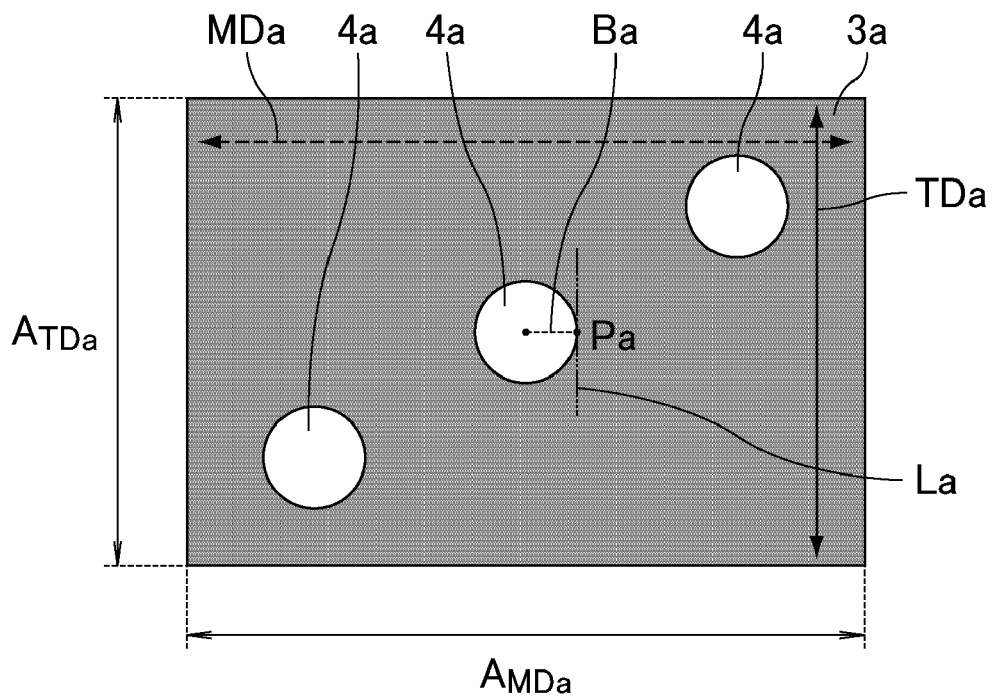
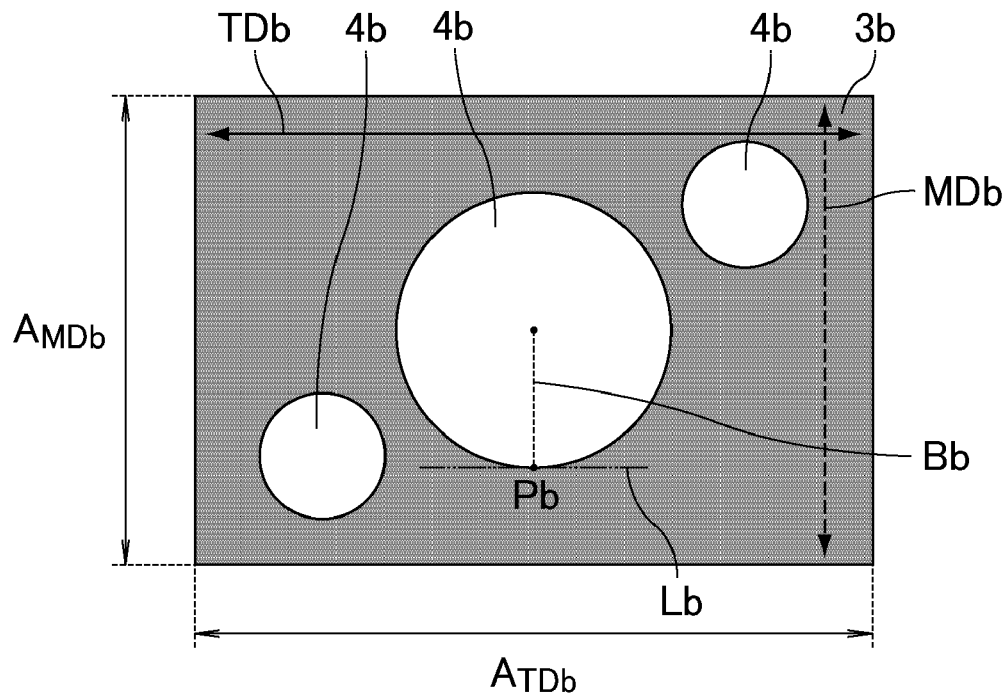

Fig. 7
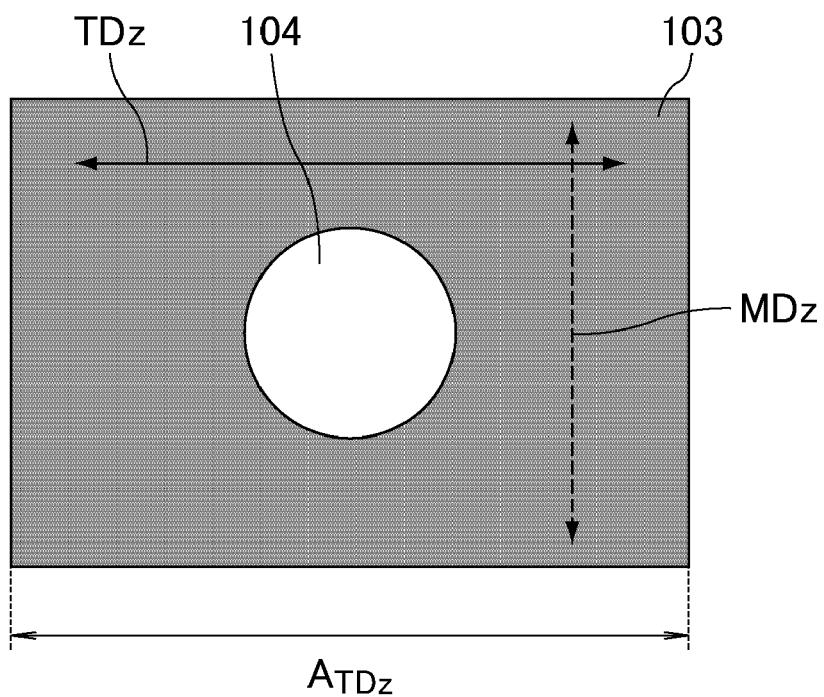
(a)
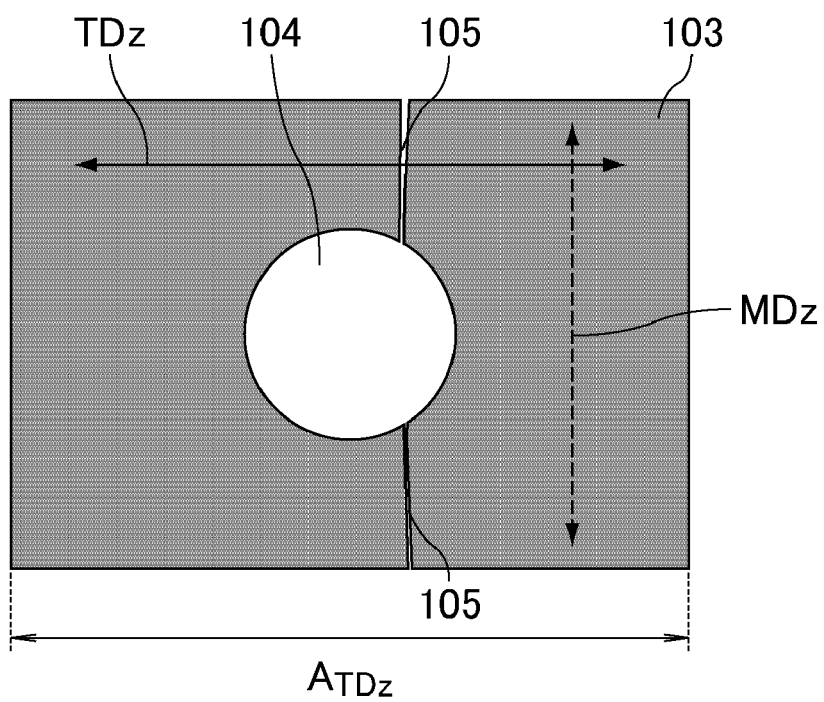
(b)

LIQUID CRYSTAL DISPLAY DEVICE

TECHNICAL FIELD

The present invention relates to liquid crystal display devices. More specifically, the present invention relates to liquid crystal display devices including a polarizing plate having a shape different from a rectangular planar shape.

BACKGROUND ART

Liquid crystal display devices are known to have a structure in which a liquid crystal display panel and a polarizing plate are assembled together. Polarizing plates are usually cut out in rectangles from a roll of raw sheet, according to the screen size of liquid crystal display panels. A common method for cutting polarizing plates is a method that employs a punching die (hereinafter also referred to as the "punching method") (for example, see Patent Literature 1).

CITATION LIST

Patent Literature
Patent Literature 1: JP 2007-187781 A

SUMMARY OF INVENTION

Technical Problem

Recent increase in versatility of liquid crystal display devices has created an increasing demand for liquid crystal display devices having a shape different from conventional shapes. In response, studies have been made to form a hole within a face of each of two rectangular polarizing plates disposed in crossed Nicols at the front and the rear of a liquid crystal display panel. Specifically, studies have been made to dispose two differently shaped polarizing plates each having a shape different from a rectangular planar shape (hereinafter also referred to as "differently shaped") in crossed Nicols at the front and the rear of a liquid crystal display panel. However, the inventors of the present invention found from their studies that when such holes are formed by the punching method, a durability test (heat shock test) causes cracking in the differently shaped polarizing plates.

The mechanism for cracking is explained with reference to FIG. 7. FIG. 7 shows schematic plan views of a conventional differently shaped polarizing plate. FIG. 7($a$) shows the state of the polarizing plate before a heat shock test, and FIG. 7($b$) shows the state of the polarizing plate after the heat shock test.

First, a rectangular polarizing plate is punched by a punching die. As shown in FIG. 7($a$), this results in a differently shaped polarizing plate 103 (hereinafter also simply referred to as the "polarizing plate 103") having a hole 104 formed within a face. The hole 104 may be formed at the same time when the rectangular polarizing plate is cut out in rectangles from a roll of raw sheet. The punching die that can be used is, for example, a Thomson punching die with a Thomson blade, a pinnacle punching die with a pinnacle blade, or an engraving die with an engraving blade. Here, when punching the rectangular polarizing plate, an edge of a face to be punched (a peripheral surface of the hole 104) of the rectangular polarizing plate receives significant damage (shock). When the polarizing plate 103 is subjected to a heat shock test to examine the durability, as shown in FIG. 7($b$), a crack 105 occurs from the hole 104 due to stress (contraction force) caused by contraction of the polarizing plate 103. Thus, when a liquid crystal display device including the polarizing plate 103 is subjected to a heat shock test, light leaks from the crack 105, reducing the reliability of the liquid crystal display device.

In a machine direction MDz (MD: Machine Direction) of the polarizing plate 103, the contraction force is smaller than the intermolecular force. In contrast, in a transverse direction TDz (TD: Transverse Direction) perpendicular to the machine direction MDz of the polarizing plate 103, the contraction force is greater than the intermolecular force. Thus, the polarizing plate 103 tends to easily contract in the transverse direction TDz. Thus, a heat shock test causes stress to split the polarizing plate in the transverse direction TDz at the damaged portion. As a result, as shown in FIG. 7($b$), the crack 105 occurs in the machine direction MDz.

The inventors found the following two tendencies as a result of investigation on the occurrence tendency of the crack 105.

[Tendency 1]

The longer a length $A_{TDz}$ of the polarizing plate 103 in the transverse direction TDz, the more likely the crack 105 will occur in a heat shock test. This is because the longer the length $A_{TDz}$ of the polarizing plate 103 in the transverse direction TDz, the greater the contraction force of the polarizing plate 103 in the transverse direction TDz.

[Tendency 2]

The smaller the hole 104, the more likely the crack 105 will occur in a heat shock test. This is because the smaller the hole 104, the more likely damage will occur to the peripheral surface of the hole 104 during punching.

Meanwhile, in a differently shaped polarizing plate disposed at the front of a liquid crystal display panel, if a hole formed within a face of the polarizing plate is too large, the hole will be easily visible and noticeable from the front of the liquid crystal display device, thus degrading the design of the liquid crystal display device.

Patent Literature 1 discloses a method for producing an optical film product by the punching method. Patent Literature 1, however, nowhere mentions the cracks and is not intended to suppress the occurrence thereof.

The present invention is made in view of the current situation described above, and aims to provide a liquid crystal display device including highly-durable, differently shaped polarizing plates and capable of preventing degradation of reliability and design.

Solution to Problem

The inventors made various studies on liquid crystal display devices having highly-durable, differently shaped polarizing plates and capable of preventing degradation of reliability. As a result, they focused on decreasing the length of each of a first differently shaped polarizing plate and a second differently shaped polarizing plate in the transverse direction and increasing the size of a hole formed in each polarizing plate, in view of Tendency 1 and Tendency 2 described above, wherein the first differently shaped polarizing plate is disposed at the front of a liquid crystal display panel, and the second differently shaped polarizing plate is disposed at the rear thereof. Meanwhile, in order to prevent degradation of design of the liquid crystal display device, the inventors focused on minimizing the size of a hole formed in the first differently shaped polarizing plate. In view of these points, in a liquid crystal display device including a first differently shaped polarizing plate and a second differently shaped polarizing plate disposed in crossed Nicols, the inventors found to design the first differently shaped polarizing plate and the second differently shaped polarizing plate as follows.

(1) The length of the first differently shaped polarizing plate in the transverse direction is made shorter than that of the second differently shaped polarizing plate in the transverse direction.

(2) The size of the hole in the first differently shaped polarizing plate is made smaller than that of the hole in the second differently shaped polarizing plate.

According to the above design, the inventors found that while the hole in the first differently shaped polarizing plate is smaller than that in the second differently shaped polarizing plate as described in (2) above to make the hole less invisible, the first differently shaped polarizing plate is less susceptible to cracking even when subjected to a heat shock test because the length thereof in the transverse direction is made shorter as described in (1) above. In addition, while the length of the second differently shaped polarizing plate in the transverse direction is made longer than that of the first differently shaped polarizing plate as described in (1) above, the second differently shaped polarizing plate is less susceptible to cracking even when subjected to a heat shock test because a hole therein is made larger as described in (2) above. Based on the above, the inventors successfully solved the problems described above, and achieved the present invention.

Specifically, in one aspect, the present invention may provide a liquid crystal display device including, in order from front to rear: a first differently shaped polarizing plate provided with a first hole formed within a face; a liquid crystal display panel; and a second differently shaped polarizing plate provided with a second hole formed within a face, wherein a machine direction of the first differently shaped polarizing plate and a machine direction of the second differently shaped polarizing plate are perpendicular to each other, and when a direction parallel to the machine direction of the first differently shaped polarizing plate is defined as a first direction, and a direction parallel to the machine direction of the second differently shaped polarizing plate is defined as a second direction, the following conditions are satisfied: a first length of the first differently shaped polarizing plate in the second direction is shorter than a second length of the second differently shaped polarizing plate in the first direction, and a first radius of curvature of the perimeter of the first hole at a tangent point between a straight line extending in the second direction and the perimeter of the first hole is smaller than a second radius of curvature of the perimeter of the second hole at a tangent point between a straight line extending in the first direction and the perimeter of the second hole.

Advantageous Effects of Invention

The present invention can provide a liquid crystal display device including highly-durable, differently shaped polarizing plates and capable of preventing degradation of reliability and design.

BRIEF DESCRIPTION OF DRAWINGS

FIG. 2 shows schematic plan views of the two differently shaped polarizing plates shown in FIG. 1 as viewed from the front. FIG. 2(a) shows a differently shaped polarizing plate disposed at the front of a liquid crystal display panel, and FIG. 2(b) shows a differently shaped polarizing plate disposed at the rear of the liquid crystal display panel.

FIG. 3 shows schematic plan views of exemplary shapes of the holes formed in the two differently shaped polarizing plates shown in FIG. 1. FIG. 3(a) shows a differently shaped polarizing plate disposed at the front of a liquid crystal display panel, and FIG. 3(b) shows a differently shaped polarizing plate disposed at the rear of the liquid crystal display panel.

FIG. 4 shows schematic plan views of exemplary shapes of the holes formed in the two differently shaped polarizing plates shown in FIG. 1, the shapes being different from those shown in FIG. 3. FIG. 4(a) shows a differently shaped polarizing plate disposed at the front of a liquid crystal display panel, and FIG. 4(b) shows a differently shaped polarizing plate disposed at the rear of the liquid crystal display panel.

FIG. 5 shows schematic plan views of cases where multiple holes are formed in the two differently shaped polarizing plates shown in FIG. 1. FIG. 5(a) shows a differently shaped polarizing plate disposed at the front of a liquid crystal display panel, and FIG. 5(b) shows a differently shaped polarizing plate disposed at the rear of the liquid crystal display panel.

FIG. 7 shows schematic plan views of a conventional differently shaped polarizing plate. FIG. 7(a) shows the state of the polarizing plate before a heat shock test, and FIG. 7(b) shows the state of the polarizing plate after the heat shock test.

DESCRIPTION OF EMBODIMENTS

The present invention is described below in more detail with reference to the drawings in the following embodiment, but is not limited to this embodiment. In the following description, similar symbols are commonly used in different drawings for the same portions or portions with similar functions, and repetitive descriptions are appropriately omitted. In addition, features of the embodiment may be appropriately combined or modified without departing from the gist of the present invention.

Embodiment

Figure 1:
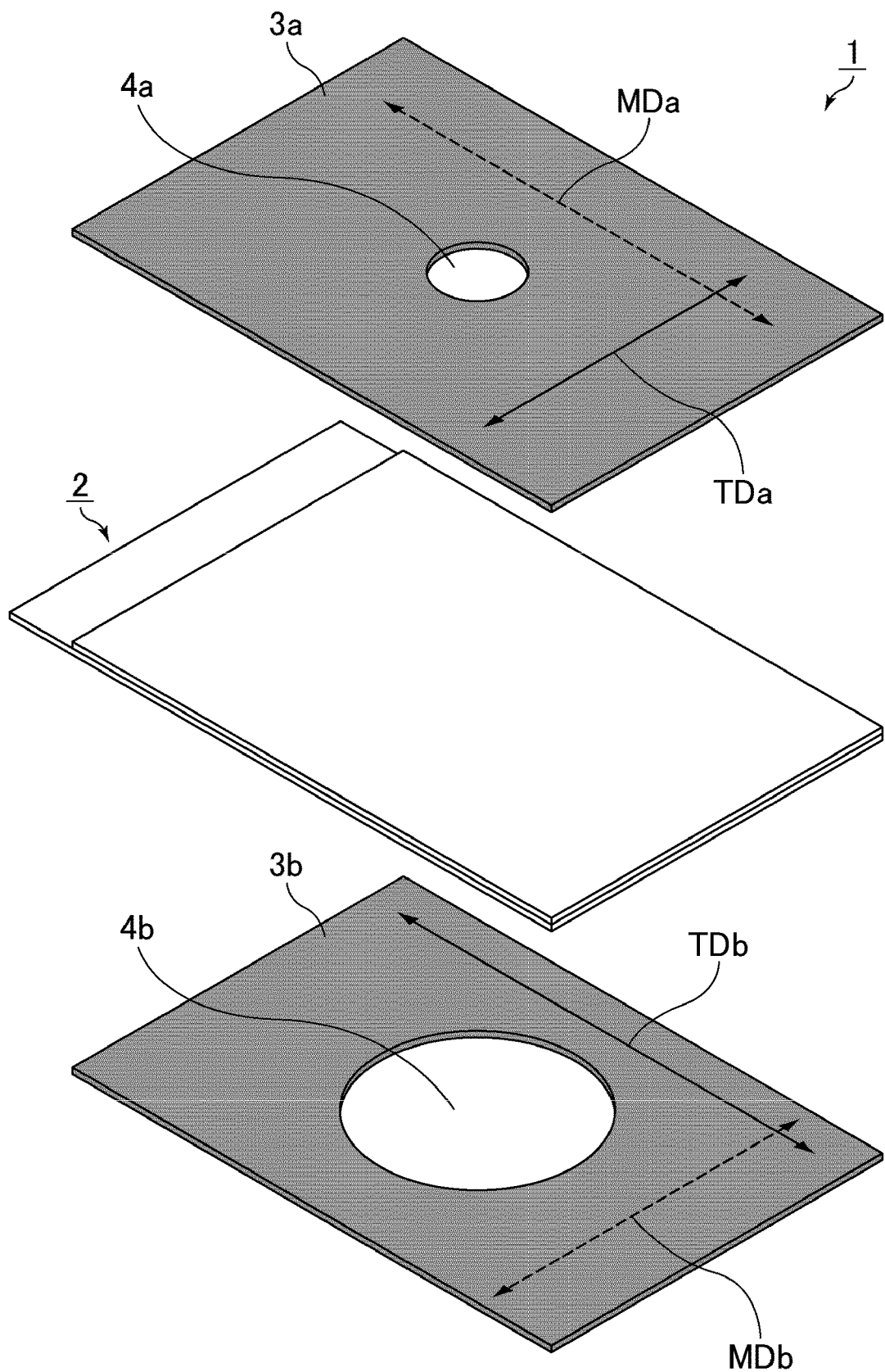
FIG. 1 shows a schematic perspective view of a liquid crystal display device according to an embodiment.

A liquid crystal display device according to an embodiment is described with reference to FIG. 1. FIG. 1 shows a schematic perspective view of a liquid crystal display device according to the embodiment.

A liquid crystal display device 1 includes: in order from front to rear, a differently shaped polarizing plate 3a (first differently shaped polarizing plate: hereinafter also simply referred to as the "polarizing plate 3a") provided with a hole 4a (first hole) formed within a face; a liquid crystal display panel 2; and a differently shaped polarizing plate 3b (second differently shaped polarizing plate: hereinafter also simply referred to as the "polarizing plate 3b") provided with a hole 4b (second hole) formed within a face. In FIG. 1, the components are separated from one another, but the polarizing plate 3a may be bonded to the front of the liquid crystal display panel 2 and the polarizing plate 3b may be bonded to the rear of the liquid crystal display panel 2 with an adhesive or the like. Herein, the term "differently shaped" means a shape different from a rectangular planar shape. Examples thereof include a shape having a hole formed in a rectangular planar surface. The term "front" indicates the upper side of the liquid crystal display device 1 in FIG. 1, for example. The term "rear" indicates the lower side of the liquid crystal display device 1 in FIG. 1, for example.

The liquid crystal display panel 2 has a structure in which a liquid crystal layer (not shown) is sandwiched between a pair of substrates. The substrates are bonded to each other with a sealing material so as to sandwich the liquid crystal layer therebetween.

The type of the pair of substrates constituting the liquid crystal display panel 2 is not particularly limited. Examples thereof include a combination of a thin-film transistor array substrate and a color filter substrate.

The thin-film transistor array substrate may have a structure in which components such as thin-film transistor elements, pixel electrodes, and various conductive lines (such as scanning lines and signal lines) are disposed on a glass substrate. A transparent substrate such as a plastic substrate may be used instead of a glass substrate.

The structure of a semiconductor layer in each thin-film transistor element is not particularly limited. For example, an amorphous silicon semiconductor, a low-temperature polysilicon semiconductor, or an oxide semiconductor may be used. Examples of materials of the oxide semiconductor include a compound formed from indium, gallium, zinc, and oxygen, and a compound formed from indium, zinc, and oxygen. In the case where a compound formed from indium, gallium, zinc, and oxygen is used for the oxide semiconductor, the amount of off-leakage current is small. Thus, once a voltage is applied, pause driving can be performed in which the voltage-applied state is held until a next data signal (voltage) is written (applied). Therefore, in terms of low power consumption, it is preferred to use a compound formed from indium, gallium, zinc, and oxygen for the oxide semiconductor.

The color filter substrate may have a structure in which components such as color filter layers and black masks (light shielding layers) are disposed on a glass substrate. A transparent substrate such as a plastic substrate may be used instead of a glass substrate. The combination of colors of the color filter layers is not particularly limited. Examples thereof include a combination of red, green, and blue and a combination of red, green, blue, and yellow. The color filter substrate may further include multiple pixel electrodes disposed thereon.

The liquid crystal display panel 2 may be provided with a hole formed within a face. In such a case, in order to provide a larger display region, a hole to be formed within a face of the liquid crystal display panel 2 is preferably smaller than the hole 4a and located at a position that overlaps with the hole 4a, when viewed from the front of the liquid crystal display device 1.

The display mode of the liquid crystal display panel 2 is not particularly limited. Examples thereof include IPS (in-plane switching) mode, FFS (fringe field switching) mode, VA (vertical alignment) mode, TN (twisted nematic) mode, and UV²A (ultra-violet induced multi-domain vertical alignment) mode.

Next, the polarizing plate 3a and the polarizing plate 3b are described with reference to FIG. 2. FIG. 2 shows schematic plan views of the two differently shaped polarizing plates shown in FIG. 1 as viewed from the front. FIG. 2(*a*) shows a differently shaped polarizing plate disposed at the front of a liquid crystal display panel, and FIG. 2(*b*) shows a differently shaped polarizing plate disposed at the rear of the liquid crystal display panel. Herein, the term "polarizing plate" indicates an optical member that allows polarized light in a specific direction to pass therethrough.

A machine direction MDa (direction parallel to the first direction) of the polarizing plate 3a and a machine direction MDb (direction parallel to the second direction) of the polarizing plate 3b are perpendicular to each other. In other words, the polarizing plate 3a and the polarizing plate 3b are disposed in crossed Nicols. Herein, that the two machine directions are perpendicular to each other means that the angle formed between the two machine directions is within the range of 90±1°, preferably within the range of 90±0.5°, particularly preferably 90° (i.e., completely perpendicular to each other). The machine direction indicates the flow direction of resin during molding of rectangular polarizing plates before one or more holes are formed therein. For example, when the differently shaped polarizing plate is an absorptive polarizing plate, the machine direction thereof is parallel to the direction of an absorption axis, and the transverse direction perpendicular to the machine direction is parallel to the direction of a transmission axis. The absorptive polarizing plate functions to absorb polarized light parallel to the absorption axis and to allow polarized light parallel to the transmission axis to pass therethrough, among incident light. In contrast, in the case where the differently shaped polarizing plate is a reflective polarizing plate, the machine direction thereof is parallel to the direction of a transmission axis, and the transverse direction perpendicular to the machine direction is parallel to the direction of a reflection axis. The reflective polarizing plate functions to reflect polarized light parallel to the reflection axis and to allow polarized light parallel to the transmission axis to pass therethrough, among incident light.

A length $A_{TDa}$ (first length) of the polarizing plate 3a in a transverse direction TDa (direction parallel to the second direction) perpendicular to the machine direction MDa is shorter than a length $A_{TDb}$ (second length) of the polarizing plate 3b in a transverse direction TDb (direction parallel to the first direction) perpendicular to the machine direction MDb.

A length $A_{MDa}$ of the polarizing plate 3a in the machine direction MDa is not particularly limited, but as shown in FIG. 2(*a*), the length $A_{MDa}$ is preferably longer than the length $A_{TDa}$ of the polarizing plate 3a in the transverse direction TDa. Such design can be easily achieved by setting the longitudinal direction of the polarizing plate 3a as the machine direction MDa and setting the lateral direction of the polarizing plate 3a as the transverse direction TDa.

A length $A_{MDb}$ of the polarizing plate 3b in the machine direction MDb is not particularly limited, but as shown in FIG. 2(*b*), the length $A_{MDb}$ is preferably shorter than the length $A_{TDb}$ of the polarizing plate 3b in the transverse direction TDb. Such design can be easily achieved by setting the longitudinal direction of the polarizing plate 3b as the transverse direction TDb and setting the lateral direction of the polarizing plate 3b as the machine direction MDb.

The shape of the hole 4a and the shape of the hole 4b are not particularly limited. They may be circular, as shown in FIGS. 2(*a*) and 2(*b*), or they may not be circular. When they are not circular, examples of the shapes include those shown in FIG. 3 and FIG. 4. FIG. 3 shows schematic plan views of exemplary shapes of the holes formed in the two differently shaped polarizing plates shown in FIG. 1. FIG. 3(*a*) shows a differently shaped polarizing plate disposed at the front of a liquid crystal display panel, and FIG. 3(*b*) shows a differently shaped polarizing plate disposed at the rear of the liquid crystal display panel. FIG. 4 shows schematic plan views of exemplary shapes of the holes formed in the two differently shaped polarizing plates shown in FIG. 1, the shapes being different from those shown in FIG. 3. FIG. 4(*a*)

shows a differently shaped polarizing plate disposed at the front of a liquid crystal display panel, and FIG. 4(b) shows a differently shaped polarizing plate disposed at the rear of the liquid crystal display panel. As shown in FIG. 3, the shape of the hole 4a and the shape of the hole 4b may be both elliptical. In addition, as shown in FIG. 4, the hole 4a and hole 4b each may have a shape whose a perimeter is a combination of straight lines and curves. In order to sufficiently prevent cracking in the polarizing plate 3a and the polarizing plate 3b in a heat shock test, preferably, the hole 4a and the hole 4b each have a shape whose perimeter is a curve (without corners), such as a circular shape or an elliptical shape.

The combination of the shape of the hole 4a and the shape of the hole 4b is not particularly limited. For example, the following combinations may be mentioned.

(1) The circular hole 4a and the circular hole 4b (FIGS. 2(a) and 2(b))

(2) The elliptical hole 4a and the elliptical hole 4b (FIGS. 3(a) and 3(b))

(3) The circular hole 4a (FIG. 2(a)) and the elliptical hole 4b (FIG. 3(b))

(4) The elliptical hole 4a (FIG. 3(a)) and the circular hole 4b (FIG. 2(b))

The number of the holes 4a is not particularly limited. There may be one hole as shown in FIG. 2(a), or may be multiple holes as shown in FIG. 5(a). The number of the holes 4b is not particularly limited. There may be one hole as shown in FIG. 2(b), or may be multiple holes as shown in FIG. 5(b). FIG. 5 shows schematic plan views of cases where multiple holes are formed in the two differently shaped polarizing plates shown in FIG. 1. FIG. 5(a) shows a differently shaped polarizing plate disposed at the front of a liquid crystal display panel, and FIG. 5(b) shows a differently shaped polarizing plate disposed at the rear of the liquid crystal display panel.

The combination of the number of the holes 4a and the number of the holes 4b is not particularly limited. For example, the following combinations may be mentioned.

(1) One hole 4 and one hole 4b (FIGS. 2(a) and 2(b))

(2) Multiple holes 4a and multiple holes 4b (FIGS. 5(a) and 5(b))

(3) One hole 4a (FIG. 2(a)) and multiple holes 4b (FIG. 5(b))

(4) Multiple holes 4a (FIG. 5(a)) and one hole 4b (FIG. 2(b))

A radius Ba of curvature (first radius of curvature) of the perimeter of the hole 4a at a tangent point Pa between a straight line La extending in the transverse direction TDa and the perimeter of the hole 4a is smaller than a radius Bb of curvature (second radius of curvature) of the perimeter of the hole 4b at a tangent point Pb between a straight line Lb extending in the transverse direction TDb and the perimeter of the hole 4b.

When there are multiple tangent points Pa between the straight line La and the perimeter of the hole 4a and there are multiple tangent points Pb between the straight line Lb and the perimeter of the hole 4b, it is sufficient if the maximum value of all the radii Ba of curvature of the perimeter of the hole 4a at the tangent points Pa is smaller than the minimum value of all the radii Bb of curvature of the perimeter of the hole 4b at the tangent points Pb.

When there are multiple holes 4a and multiple holes 4b, it is sufficient if the maximum value of all the radii Ba of curvature of the perimeters of the holes 4a is smaller than the minimum value of all the radii Bb of curvature of the perimeters of the holes 4b.

The radius Ba of curvature of the perimeter of the hole 4a and the radius Bb of curvature of the perimeter of the hole 4b are as shown in FIGS. 2 to 5. For example, in the case where the shape of the hole 4a is circular as shown in FIG. 2(a), the radius Ba of curvature of the perimeter of the hole 4a corresponds to the radius of the hole 4a. In addition, in the case where the shape of the hole 4b is circular as shown in FIG. 2(b), the radius Bb of curvature of the perimeter of the hole 4b corresponds to the radius of the hole 4b. As shown in FIG. 4(b), in the case where the straight line Lb extending in the transverse direction TDb is in contact with a straight line portion of the perimeter of the hole 4b, the radius Bb of curvature of perimeter of the hole 4b can be assumed to be infinite.

The following effects can be attained according to this embodiment.

(1) Since the length $A_{TD}a$ of the polarizing plate 3a in the transverse direction TDa is shorter than the length $A_{TDb}$ of the polarizing plate 3b in the transverse direction TDb, the polarizing plate 3a has improved durability.

(2) Since the radius Bb of curvature of the perimeter of the hole 4b is larger than the radius Ba of curvature of the perimeter of the hole 4a, the polarizing plate 3b has improved durability.

(3) Owing to the effects described in (1) and (2) above, the occurrence of light leakage due to the polarizing plate 3a and the polarizing plate 3b (light leakage due to cracks) is suppressed, thus preventing degradation of reliability of the liquid crystal display device 1.

(4) Since the radius Ba of curvature of the perimeter of the hole 4a is smaller than the radius Bb of curvature of the perimeter of the hole 4b, the hole 4a is not easily visible from the front of the liquid crystal display device 1, preventing degradation of design of the liquid crystal display device 1. In contrast, the hole 4b is disposed to overlap with a light-shielding region of the liquid crystal display panel 2 in which components such as black masks are disposed, when viewed from the rear of the liquid crystal display device 1. Thus, although the radius Bb of curvature of the perimeter of the hole 4b is larger, the hole 4b can be made less visible from the front of the liquid crystal display device 1.

[Study 1]

The relationship between the length of the differently shaped polarizing plate in the transverse direction and the durability of the differently shaped polarizing plate is explained with reference to study examples, based on heat shock test results.

Study Example 1

Figure 6:
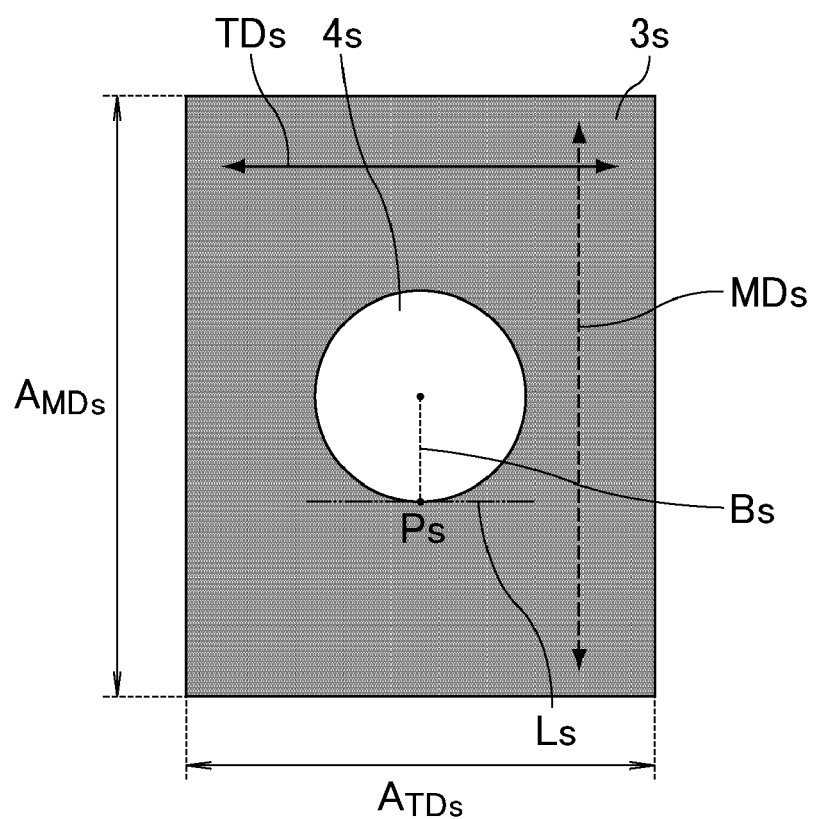
FIG. 6 shows a schematic plan view of a differently shaped polarizing plate of Study Example 1.

FIG. 6 shows a schematic plan view of a differently shaped polarizing plate of Study Example 1. As shown in FIG. 6, a differently shaped polarizing plate 3s (hereinafter also referred to as the "polarizing plate 3s") is provided with a hole 4s formed within a face. The polarizing plate 3s was obtained by punching a rectangular polarizing plate available from Nitto Denko Corporation (product name: CRT1794) with a pinnacle punching die.

A length $A_{MDs}$ of the polarizing plate 3s in a machine direction MDs was 50 mm. A length $A_{TDs}$ of the polarizing plate 3s in a transverse direction TDs perpendicular to the machine direction MDs was 30 mm.

The shape of the hole 4s was circular. A radius Bs of curvature of the perimeter of the hole 4s at a tangent point Ps between a straight line Ls extending in the transverse direction TDs and the perimeter of the hole 4s corresponds to the radius of the hole 4s, and was 1 mm.

Study Example 2

The same differently shaped polarizing plate as in Study Example 1 was used, except that the length $A_{TDs}$ of the polarizing plate 3s in the transverse direction TDs was changed to 40 mm.

Study Example 3

The same differently shaped polarizing plate as in Study Example 1 was used, except that the length $A_{TDs}$ of the polarizing plate 3s in the transverse direction TDs was changed to 50 mm.

Study Example 4

The same differently shaped polarizing plate as in Study Example 1 was used, except that the length $A_{TDs}$ of the polarizing plate 3s in the transverse direction TDs was changed to 60 mm.

Study Example 5

The same differently shaped polarizing plate as in Study Example 1 was used, except that the length $A_{TDs}$ of the polarizing plate 3s in the transverse direction TDs was changed to 70 mm.

Study Example 6

The same differently shaped polarizing plate as in Study Example 1 was used, except that the length $A_{TDs}$ of the polarizing plate 3s in the transverse direction TDs was changed to 80 mm.

(Evaluation Test 1)

Each of the differently shaped polarizing plates of Study Examples 1 to 6 was subjected to a heat shock test. Table 1 shows the test results.

The heat shock test was performed using a thermal shock chamber available from Espec Corporation (product name: TSA-71L-A). Specifically, the differently shaped polarizing plate of each study example was maintained in an environment at a temperature of 85° C. (hereinafter also referred to as the "environment E1") for 30 minutes, and subsequently, was maintained in an environment at a temperature of −40° C. (hereinafter also referred to as the "environment E2") for 30 minutes. This procedure as one cycle was repeated for two sets (120 cycles and 240 cycles). Here, the switching time between the environment E1 and the environment E2 was 30 minutes. After the heat shock test of each set, the differently shaped polarizing plate of each study example was visually observed for the occurrence of cracks. The results are shown with A indicating no cracking and B indicating cracking.

TABLE 1

| | Length $A_{TDs}$ (mm) | Radius Bs of curvature (mm) | Heat shock test 120 cycles | Heat shock test 240 cycles |
|---|---|---|---|---|
| Study Example 1 | 30 | 1 | A | A |
| Study Example 2 | 40 | 1 | A | A |
| Study Example 3 | 50 | 1 | A | A |
| Study Example 4 | 60 | 1 | A | B |
| Study Example 5 | 70 | 1 | A | B |
| Study Example 6 | 80 | 1 | A | B |

As shown in Table 1, in each of Study Examples 1 to 3, the heat shock test with 240 cycles did not cause cracking. In contrast, in each of Study Examples 4 to 6, although the heat shock test with 120 cycles did not cause cracking, the heat shock test with 240 cycles caused cracking.

Based on the above, it was found that the shorter the length $A_{TDs}$ of the polarizing plate 3s in the transverse direction TDs, the better the durability of the polarizing plate 3s. It was also found that, in the case of using the polarizing plate 3s of each study example, the length $A_{TDs}$ of the polarizing plate 3s in the transverse direction TDs is preferably 50 mm or less, with the radius Bs of curvature of the perimeter of the hole 4s being 1 mm, in order to sufficiently improve the durability of the polarizing plate 3s.

[Study 2]

The relationship between the radius of curvature of the perimeter of the hole and the durability of the differently shaped polarizing plate is explained with reference to study examples, based on heat shock test results.

Study Example 7

The same differently shaped polarizing plate as in Study Example 4 was used, except that the radius Bs of curvature of the perimeter of the hole 4s was changed to 0.5 mm.

Study Example 8

The same differently shaped polarizing plate as in Study Example 7 was used, except that the radius Bs of curvature of the perimeter of the hole 4s was changed to 2 mm.

Study Example 9

The same differently shaped polarizing plate as in Study Example 7 was used, except that the radius Bs of curvature of the perimeter of the hole 4s was changed to 3 mm.

Study Example 10

The same differently shaped polarizing plate as in Study Example 7 was used, except that the radius Bs of curvature of the perimeter of the hole 4s was changed to 4 mm.

(Evaluation Test 2)

The differently shaped polarizing plates of Study Examples 7 to 10 were subjected to the same heat shock test as the one in Evaluation Test 1 described above. Table 2 shows the test results. Table 2 also shows the test results of Study Example 4 in which the length $A_{TDs}$ of the polarizing plate 3s in the transverse direction TDs was the same (60 mm) as that in Study Examples 7 to 10.

TABLE 2

|  | Length $A_{TDs}$ (mm) | Radius Bs of curvature (mm) | Heat shock test 120 cycles | Heat shock test 240 cycles |
|---|---|---|---|---|
| Study Example 7 | 60 | 0.5 | A | B |
| Study Example 4 | 60 | 1 | A | B |
| Study Example 8 | 60 | 2 | A | A |
| Study Example 9 | 60 | 3 | A | A |
| Study Example 10 | 60 | 4 | A | A |

As shown in Table 2, in each of Study Examples 8 to 10, the heat shock test with 240 cycles did not cause cracking. In contrast, in each of Study Examples 4 and 7, although the heat shock test with 120 cycles did not cause cracking, the heat shock test with 240 cycles caused cracking.

Based on the above, it was found that the larger the radius Bs of curvature of the perimeter of the hole 4s, the better the durability of the polarizing plate 3s. It was also found that, in the case of using the polarizing plate 3s of each study example, the radius Bs of curvature of the perimeter of the hole 4s is preferably 2 mm or more, with the length $A_{TDs}$ of the polarizing plate 3s in the transverse direction TDs being 60 mm, in order to sufficiently improve the durability of the polarizing plate 3s.

[Additional Remarks]

Examples of preferred features of the liquid crystal display device of the present invention are listed below. These features may be appropriately combined without departing from the gist of the present invention.

The first hole and the second hole each may have a shape whose perimeter is a curve. This results in sufficiently improved durability of the first differently shaped polarizing plate and the second differently shaped polarizing plate.

The shape of the first hole and the shape of the second hole may be both circular. Thus, the present invention is also applicable to the case where the shape of the first hole and the shape of the second hole are both circular.

The shape of the first hole and the shape of the second hole may be both elliptical. Thus, the present invention is also applicable to the case where the shape of the first hole and the shape of the second hole are both elliptical.

One of the shape of the first hole and the shape of the second hole may be circular, and the other one may be elliptical. Thus, the present invention is also applicable to the case where one of the shape of the first hole and the shape of the second hole is circular, and the other one is elliptical.

The number of the first holes may be one and the number of the second holes may be one. Thus, the present invention is also applicable to the case of one first hole and one second hole.

The number of the first holes may be two or more and the number of the second holes may be two or more. Thus, the present invention is also applicable to the case of multiple first holes and multiple second holes.

The number of the first holes may be one and the number of the second holes may be two or more, or the number of the first holes may be two or more and the number of the second holes may be one. Thus, the present invention is also applicable to the case of one first hole and multiple second holes and the case of multiple first holes and one second hole.

REFERENCE SIGNS LIST

1: liquid crystal display device
2: liquid crystal display panel
3a, 3b, 3s, 103: differently shaped polarizing plate
4a, 4b, 4s, 104: hole
105: crack
MDa, MDb, MDs, MDz: machine direction (MD)
TDa, TDb, TDs, TDz: transverse direction (TD)
$A_{MDa}$, $A_{MDb}$, $A_{MDs}$: length of differently shaped polarizing plate in machine direction
$A_{TDa}$, $A_{TDb}$, $A_{TDs}$, $A_{TDz}$: length of differently shaped polarizing plate in transverse direction
Ba, Bb, Bs: radius of curvature of perimeter of hole
La, Lb, Ls: straight line extending in transverse direction
Pa, Pb, Ps: tangent point

The invention claimed is:

1. A liquid crystal display device comprising, in order from front to rear:
a first differently shaped polarizing plate provided with a first hole formed within a face;
a liquid crystal display panel; and
a second differently shaped polarizing plate provided with a second hole formed within a face,
wherein the first differently shaped polarizing plate is an absorptive polarizing plate having an absorption axis in a first direction or a reflective polarizing plate having a transmission axis in a first direction,
the second differently shaped polarizing plate is an absorptive polarizing plate having an absorption axis in a second direction or a reflective polarizing plate having a transmission axis in a second direction,
the first direction of the first differently shaped polarizing plate and the second direction of the second differently shaped polarizing plate are perpendicular to each other, and
a first length of the first differently shaped polarizing plate in the second direction is shorter than a second length of the second differently shaped polarizing plate in the first direction, and
a first radius of curvature of the perimeter of the first hole at a tangent point between a straight line extending in the second direction and the perimeter of the first hole is smaller than a second radius of curvature of the perimeter of the second hole at a tangent point between a straight line extending in the first direction and the perimeter of the second hole, and
the first hole overlaps with the second hole in a plane view.

2. The liquid crystal display device according to claim 1, wherein the first hole and the second hole each have a shape whose perimeter is a curve.

3. The liquid crystal display device according to claim 2, wherein the shape of the first hole and the shape of the second hole are both circular.

4. The liquid crystal display device according to claim 2, wherein the shape of the first hole and the shape of the second hole are both elliptical.

5. The liquid crystal display device according to claim 2, wherein one of the shape of the first hole and the shape of the second hole is circular, and the other one is elliptical.

6. The liquid crystal display device according to claim 1, wherein a number of the first holes is one and a number of the second holes is one.

7. The liquid crystal display device according to claim 1, wherein a number of the first holes is two or more and a number of the second holes is two or more.

8. The liquid crystal display device according to claim 1, wherein a number of the first holes is one and a number of the second holes is two or more, or the number of the first holes is two or more and the number of the second holes is one.

* * * * *